(12) United States Patent
Kennedy et al.

(10) Patent No.: US 9,167,033 B2
(45) Date of Patent: Oct. 20, 2015

(54) TRANSMISSION DEVICE LOAD BALANCING

(71) Applicant: Comcast Cable Communications, LLC, Philadelphia, PA (US)

(72) Inventors: Chris Kennedy, Highlands, CO (US); Francis Sandoval, Philadelphia, PA (US)

(73) Assignee: Comcast Cable Holdings, LLC, Philadelphia, PA (US)

(*) Notice: Subject to any disclaimer, the term of this patent is extended or adjusted under 35 U.S.C. 154(b) by 195 days.

(21) Appl. No.: 13/826,950

(22) Filed: Mar. 14, 2013

(65) Prior Publication Data

US 2014/0281016 A1 Sep. 18, 2014

(51) Int. Cl.
*G06F 15/173* (2006.01)
*H04L 29/08* (2006.01)
*H04L 29/06* (2006.01)
*H04N 21/00* (2011.01)
*H04N 21/2225* (2011.01)
*H04N 21/231* (2011.01)
*H04N 21/24* (2011.01)

(52) U.S. Cl.
CPC ............ *H04L 67/1012* (2013.01); *H04L 65/00* (2013.01); *H04L 65/4084* (2013.01); *H04L 65/80* (2013.01); *H04N 21/00* (2013.01); *H04N 21/2225* (2013.01); *H04N 21/23103* (2013.01); *H04N 21/2405* (2013.01)

(58) Field of Classification Search
USPC .................................. 709/234, 224, 225, 226
See application file for complete search history.

(56) References Cited

U.S. PATENT DOCUMENTS

| | | | |
|---|---|---|---|
| 6,438,110 B1 * | 8/2002 | Rai et al. ........................ | 370/254 |
| 7,111,063 B1 * | 9/2006 | Clark et al. .................... | 709/225 |
| 2004/0037558 A1 * | 2/2004 | Beshai ............................. | 398/57 |
| 2011/0007672 A1 * | 1/2011 | Park et al. ...................... | 370/280 |
| 2013/0190637 A1 * | 7/2013 | Zhang et al. ................... | 600/521 |

\* cited by examiner

*Primary Examiner* — Jude Jean Gilles
(74) *Attorney, Agent, or Firm* — Banner & Witcoff, Ltd.

(57) ABSTRACT

A content providing service may employ a variety of streaming devices such as servers, and may associate or assign the servers to different content duration time ranges. Each server may then be responsible for servicing requests for content whose duration lies within the server's assigned content duration time range. In response to overload or underload status of a server, the server's time range may be adjusted. The time range of other servers in the system may also be adjusted to compensate.

20 Claims, 5 Drawing Sheets

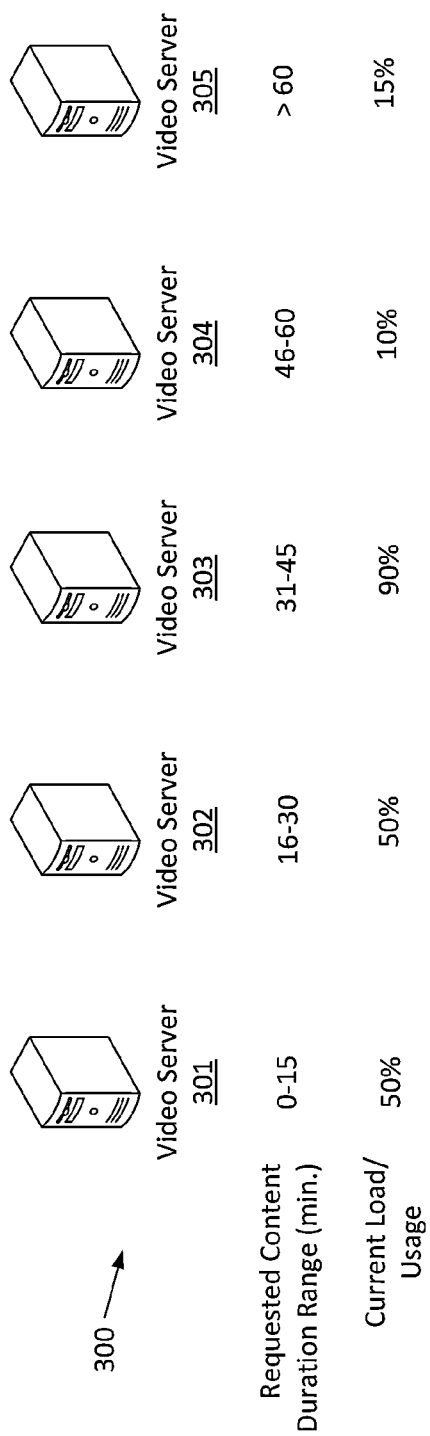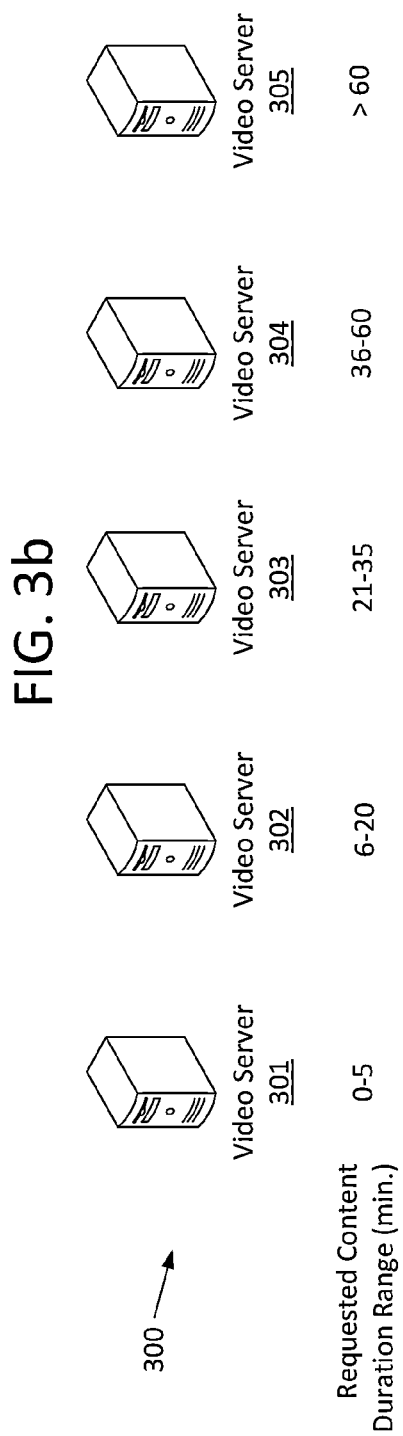

TRANSMISSION DEVICE LOAD BALANCING

BACKGROUND

Content delivery networks provide streaming video services, such as streaming of movies on demand, Internet videos, etc. to a variety of users. The operator of the service must maintain a number of computing device servers to respond to requests, but operating such servers consumes resources, such as electricity and personnel maintenance time. The operator must strike a balance between having enough servers to adequately service user requests, and having too many excess servers that waste resources. There remains an ever-present need to efficiently use those and other resources.

SUMMARY

The following summary is for illustrative purposes only, and is not intended to limit or constrain the detailed description.

Features herein relate to an approach to balancing loads on computing devices in a network. A plurality of computing devices may be available to service requests, and incoming requests for content (e.g., streaming content) may be distributed to the computing devices based on the duration of the requested content. A computing device may be assigned a unique duration range, such as 30-45 minutes, and requests for content streaming content whose duration lies within that range may be directed to the computing device. The load carried by each computing device may be monitored, and the duration ranges of the various computing devices may be dynamically adjusted to help redistribute the processing of future incoming requests.

In some embodiments, the various computing devices may be assigned sequential time ranges, and may be logically arranged in a hierarchy in order of their time ranges (e.g., 0-15 minutes, then 16-30 minutes, then 31-45 minutes, etc., if in minutes, or otherwise in seconds, hours or other duration). An adjustment of one of the devices' time range due to overload or underload may be propagated throughout other devices in the hierarchy, resulting in a shifting of the time ranges serviced by those other devices for future requests. The shifting direction may be either up the hierarchy or down the hierarchy, and may depend on whether the load status of is due primarily to overhead processing of streams.

In some embodiments, the shifting of the other devices' time ranges may be done in equal increments, matching the adjustment of the over- or underloaded device. In some embodiments, the shifting may vary depend on the shifted device's capacity as well.

As a result of the shifting, the lowest level device in the hierarchy may end up with a zero time range (e.g., if a higher server is underloaded, and its time range is shifted by an amount that consumes the lowest device's time), and that device may enter a shutdown or hibernation state once it completes processing the content or streams it is already handling. By scheduling the lowest level device for shutdown, the shutdown may be realized sooner, since it is handling the content of the shortest duration.

In some embodiments, dedicated computing devices may be employed to handle content that is known to be very popular, or known to be not very popular at all. These dedicated computing devices may be used in the streaming service, but may be omitted from the time range assignment and shifting.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 3a-b illustrate example streaming servers in different load situations.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various features described herein relate to managing the processing load of a plurality of server computing devices that offer streaming content to users. The streaming content may be, for example, videos on demand, Internet videos, audio files, songs, and any other transmission of content that has a known duration for consumption and/or transmission. These servers may be assigned a duration time range, and the servers may be instructed to handle requests for streaming content whose duration falls within the server's assigned duration time range. As servers become over- and underloaded, their time ranges may be adjusted to help balance out the processing load, and to help shut down excess server capacity. Other factors, such as anticipated popularity of content, may also be used to help determine which assets are assigned to a particular server, and in doing so, the less popular content may be relegated to the servers who are candidates for entering an idle or low-power state.

Figure 1:
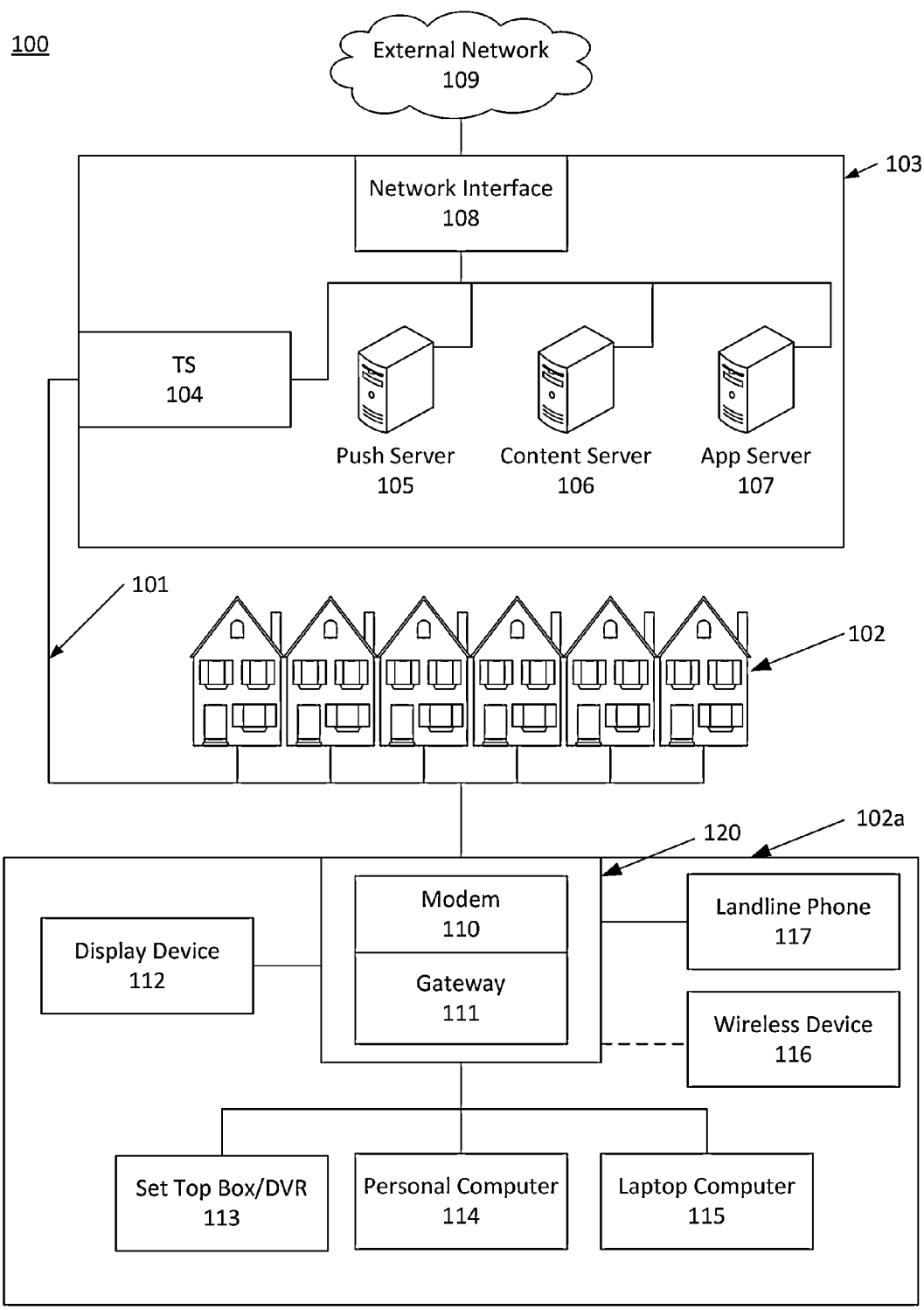
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
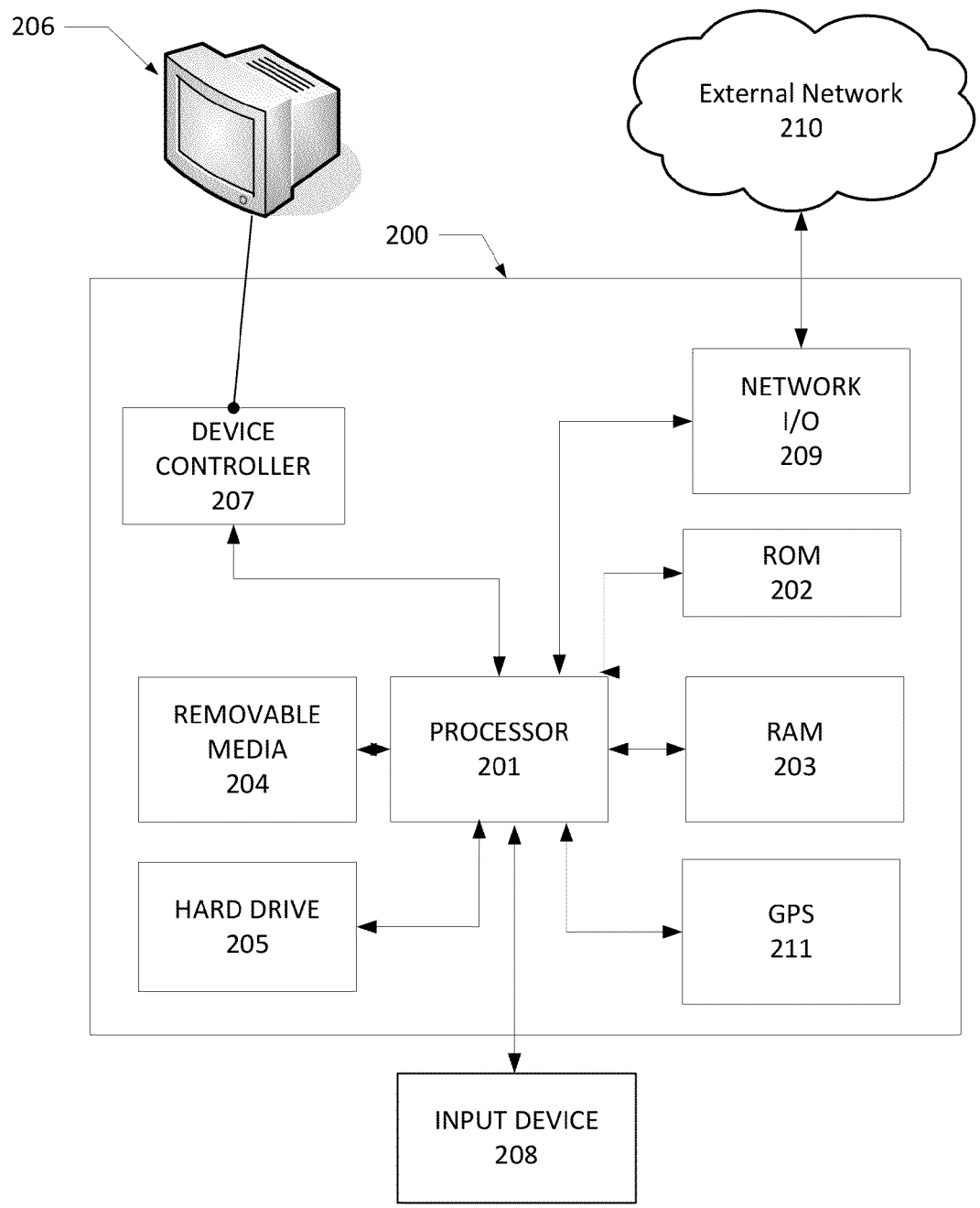
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

As noted above, features described herein relate to managing the processing load of content streaming server computing devices. FIGS. 3*a-b* illustrate an example of the kind of load balancing that can be accomplished using the features described herein, while FIG. 4 illustrates a detailed process of how this may be accomplished.

FIG. 3*a* illustrates an example system 300 of content transmitting computing devices, such as video servers 301-305. Each computing device may be implemented as a computing device using the structure shown in FIG. 2, and may be configured to respond to user requests for content, such as streaming content. For example, the computing devices may provide video on demand services, and may deliver streaming videos, such as movies, television shows, radio programs and Internet videos, to users. In the illustrated 3A example, each video computing device is assigned in a hierarchy in which successive computing devices are assigned unique and non-overlapping time ranges. Video computing device 301 is assigned the range of zero to 15 minutes; computing device 302 is assigned the range of 16-30 minutes; and so on until the final computing device 305, which is assigned a range of greater than 60 minutes. These assignments may be made and maintained in memory by a load management computing device, which can also be implemented using the FIG. 2 configuration, and may be an application server 107. When a new incoming streaming request is received, the duration of the requested content is used to determine which of the computing devices will handle the request. The example shows five computing devices for ease of explanation. In implementation, more or fewer computing devices may be used, and each computing device depicted may in fact be implemented using one or more computing devices.

As illustrated in FIG. 3*a*, the current load (e.g., usage level), as expressed as a percentage of the computing device's overall service capacity, may be monitored by a load management computing device (e.g., an application server 107). In the example, computing devices 301 and 302 are operating at 50% load, computing device 303 is rather heavily loaded at 90%, computing device 304 is lightly loaded at 10%, and computing device 305 is lightly loaded at 15%. This indicates that a relatively large number of users have requested streaming content that is between 31 and 45 minutes long (as evidenced by the load on computing device 303), and that relatively few users have requested content that is 46 to 60 minutes long. The processing load of a server computing device may be expressed in any desired manner, and percentages are merely used as an example here. The percentages may be based on measured clock cycle usage, processing queue, total number of active streams and stream types, memory space, or any other desired metric for measuring a computing device's performance load.

In the FIG. 3*a* example, computing device 304 is lightly loaded. In response to this, the system (e.g., the load management computing device noted above) may reassign the time range durations of the service. FIG. 3*b* shows an example in which the computing device 304's range is increased by ten minutes, so that its lower bound is reduced from 46 minutes to 36 minutes. The increase in time range should result in more future requests being assigned to computing device 304. The adjustment may be propagated to other computing devices in the system as well. Computing device 303, which previously served the ten-minute portion that was reassigned to computing device 304, has that ten-minute portion removed from its upper range, lowering its upper limit from 45 to 35. In some embodiments, the propagation of the range change may seek to keep the other computing device's overall duration size the same (e.g., to keep it at 15 minutes). In such embodiments, computing device 303 would still serve a 15-minute range—the range would just be lowered by ten minutes, to be 21-35 minutes, instead of the previous 31-45 minutes shown in FIG. 3*a*.

The change may be propagated down to computing device 302 as well. Its range is shown as shifted from 16-30 minutes to 6-20 minutes, in response to the shifting of the computing device 303's range. Similarly, computing device 301 is shifted from 0-15 to 0-5 minutes. Its lower boundary is zero, so no further reduction is possible. As a result, computing device 301's range is now just five minutes long, and going forward this computing device will be instructed to handle requests for streaming content that is five minutes or less in duration. This shifting of ranges need not affect the requests that the computing devices are already handling. For example, computing device 303 may continue to stream the content that it is currently streaming due to previous requests, even if the requested content is no longer in the computing device 303's assigned duration range (e.g., if computing device 303 started streaming a 45-minute show just before its range was shifted to 21-35 minutes, it would still continue streaming that 45-minute show). The adjusting and shifting of a computing device's time range duration may simply affect how future incoming requests are distributed.

As a consequence of the shifting, the lowest computing device in the hierarchy (e.g., the one with the shortest duration) may soon become unnecessary. In the FIG. 3a-b example, computing device 301 was handling content up to 15 minutes long before the shift, and then after the shift, it would only be given new requests for content that is five minutes long or shorter. If computing device 301 does not receive any new requests for content (and it is less likely to receive such requests, since its responsibilities have shrunk to just content that is five minutes long) by the time it finishes servicing its existing load, then that lowest computing device 301 may be shut down to conserve energy. Its five-minute range of responsibilities may be passed back up the hierarchy, to computing device 302, which may result in a similar propagation going up the hierarchy.

FIG. 4 illustrates an example process by which the processing load may be distributed among the computing devices in the system. The process may be performed by a load management computing device, which may be an application computing device 107, or by any one of the computing devices 301-305. In step 401, the various streaming computing devices in the hierarchy may be identified. This identification can be done by having the various computing devices initiate operation (e.g., begin executing a video server program) and reporting in to a load management computing device.

In step 402, the load management computing device may associate initial duration time ranges to the identified computing devices. This associating may include assigning the time ranges to the computing devices, or using network condition data to ascertain the time ranges for the computing devices, or simply accessing stored information providing time ranges for the various computing devices. The initial durations may be arbitrarily chosen (e.g., 15 minutes), or they may be based on the known duration of the content being offered, and/or on a predicted level of popularity of the content.

In step 403, the load management computing device may set and store in memory initial overload and underload levels for each of the computing devices. As discussed above regarding FIGS. 3a&b, these levels may be expressed as a percentage of the computing device's computational capacity, or by any other desired metric for measuring computing device performance. A computing device's overload level may indicate the level above which the computing device should be considered overloaded (and for which remedial action may be needed to reduce the computing device's future workload), and a computing device's underload level may indicate the level below which the computing device should be considered underloaded (and for which remedial action may be needed to increase the computing device's future workload).

In step 404, the load management computing device may set values to indicate how it will respond to computing devices becoming overloaded or underloaded. One value may be the adjustment interval. As discussed in the FIG. 3a-b example, the computing device 304's time range was decreased by ten minutes, and the lower level computing devices in the hierarchy (e.g., computing devices 301, 302, 303) were shifted by ten minutes. In those examples, the adjustment interval was ten minutes. That interval indicates the amount of time that an underloaded computing device's range may be increased, and the interval by which other neighboring computing devices (in the hierarchy) are shifted. Computing devices may be considered neighbors in the hierarchy if their time ranges are adjacent to one another (e.g., the range of 46-60 minutes follows the range of 31-45 minutes).

In the example above, the adjustment interval was measured in time (ten minutes). In alternative embodiments, the adjustment interval may be measured as a percentage of the computing device's capacity. For example, underloaded video computing device 304 may have its range increased by 20% of its current interval, whatever that interval may be. The resulting shift may then be propagated down to the other lower level computing devices in the hierarchy.

The adjustment interval may alternatively be a percentage of the next neighboring computing device's range, instead of its own. For example, instead of adjusting computing device 304 by 20% of computing device 304's range, the load management computing device can adjust computing device 304's range by 20% of computing device 303's range. The other neighboring computing devices in the hierarchy may have their ranges shifted to account for the increase in underloaded computing device 304's range.

The adjustment interval may also be determined based on the underloaded level, to avoid exceeding the maximum capacity (or alternatively, the overload level) of the underloaded computing device. If the underutilization level is set at 75%, such that a computing device is considered underloaded if its current load falls to 75% or less, then the adjustment interval may be set to be no more than 25% of the underloaded computing device's capacity (to avoid exceeding 100%), or set to 20% of the underloaded computing device's capacity if the load management computing device wishes to maintain a 5% buffer (or if the overload level for the computing device is 95%).

Adjustment intervals for underloaded computing devices may be the same as, or different from, adjustment intervals for overloaded computing devices. For example, the load management system may wish to give immediate, more drastic, relief to overloaded computing devices, and may use a larger overload adjustment interval than an underload adjustment interval (e.g., shrinking an overloaded computing device's time range by a larger amount than the increase that would be used if the computing device were underloaded).

The load management computing device may also establish a direction of adjustment in step 404. The direction of adjustment may indicate how time range changes to an overloaded or underloaded computing device may affect other computing devices in the hierarchy. In the examples above, an underloaded computing device has its time range increased by lowering the lower end of the underloaded computing device's time range, and the additional time is taken from the next lower computing device in the hierarchy (the computing device whose time range precedes the time range of the underloaded computing device). The ensuing adjustments in time ranges may then be propagated downward in the hierarchy, or to the left in FIG. 3a&b, shifting the affected computing devices' ranges (while maintaining their time range duration). For such underloaded computing device treatment, the load management computing device may store information indicating that an underloaded computing device's change is propagated downward in the hierarchy, and that the affected computing devices have their ranges shifted by an amount equal to the adjustment made to the underloaded computing device.

An overloaded computing device may have its time range reduced by reducing its time range by the overload adjustment interval, and the load management computing device may store information indicating this treatment as well. So, for example, if computing device 303 is overloaded in the FIG. 3a embodiment, then its time range of 31-45 minutes may be reduced to be 41-45 minutes, and the time ranges of the lower computing devices in the hierarchy (e.g., to the left in FIG. 3a, or the ones with time ranges that are before the overloaded computing device) may all be shifted by the overload adjustment interval. In such an example, computing device 302 would have its range shifted from 16-30 to 26-40 minutes, and computing device 301 would be shifted up from 0-15 to 10-25 minutes. The example process in FIG. 4 uses these example overload and underload response settings, but other settings may be used and implemented as well.

In step 405, the load management computing device may begin to offer its streaming content to users, activating the computing devices 301-305, and monitoring the computing devices' performance. This monitoring may involve the load management computing device exchanging status messages with the respective computing devices, who may report in their current usage levels. Alternatively, the load management computing device may track the computing devices' usage by monitoring the requests that are distributed to the computing devices.

In step 406, the load management computing device may determine whether a user has requested to stream content. The request may be received, for example, from an Internet page hosted by the load management computing device. If a request has been received, then in step 407, the load management computing device may determine the duration of the requested content. This determination may be done, for example, by consulting a stored table identifying content and various characteristics of the content, such as the content duration.

In step 408, the load management computing device may determine which computing device's time range contains the duration of the requested content, and may forward the incoming request to the determined computing device for further response. That determined computing device (e.g., computing device 302 if the requested content is 16 and 30 minutes in duration, in the FIG. 3a time ranges) may then begin to service the request, responding to the requesting device (e.g., the user's tablet computer or content viewing device) and initiating a stream to provide the requested content.

In step 409, the load management computing device may determine whether any of the computing devices are overloaded. This determination may be made by comparing the computing device's current load level against the overload level, to determine whether the load level meets or exceeds the overload level. If a computing device is overloaded, then in step 410, the load management computing device may reduce the overloaded computing device's time range by the overload adjustment interval. For example, in the FIG. 3a embodiment, this may entail lowering computing device 303's range from 31-45 minutes to 41-45 minutes, but raising the lower bound of the computing device 303's time range. Adjusting the time intervals of a computing device may simply entail the load management computing device updating information it has stored in memory, identifying the computing devices' respective ranges.

In step 411, the load management computing device may then propagate the time interval adjustment downwards in the hierarchy, affecting the computing devices whose time ranges were earlier than the overloaded computing device's range, until the lowest computing device in the hierarchy is encountered. In the FIG. 3a example, computing devices 301 and 302 are below the overloaded computing device, but computing device 301 is the lowest in the hierarchy, so in step 411 the load management computing device may merely shift the range of computing device 302. That computing device's range may be shifted by the adjustment interval (e.g., ten minutes), so that instead of 16-30 minutes, that computing device would have a range of 26-40 minutes. If the overloaded computing device was the lowest computing device, then this step may be skipped.

Shifting the lowest computing device results in a gap in coverage (e.g., 0-9 minutes, in the example above), and the process may include determining whether the lowest computing device can simply absorb this coverage gap. In step 412, the load management computing device may determine whether the load level of the lowest level computing device is below an absorption threshold. The absorption threshold, which may also have been established in step 403, may indicate a level below which the adjustment time will simply be absorbed by the lowest computing device. So, for example, if the absorption threshold is set to 50%, then in step 412, the load management computing device may determine whether the lowest computing device (e.g., computing device 301 in FIG. 3a) is at or below the absorption threshold. If it is at or below that threshold, then in step 413, the additional time range is simply assigned to the lowest computing device. So in the FIG. 3a example, computing device 301 is at or below 50%, so its range would simply be changed to absorb the extra ten minutes—its range would change from 0-15 minutes to 0-25 minutes.

Alternatively, in step 412, if the lowest computing device's load level is above the absorption level, then it should not absorb the gap, and in step 414, the load management computing device may activate a new computing device, and assign it the lowest range (filling the gap between zero and the lower bound of the previous lowest computing device). In the example above, this would entail adding a new computing device to handle the range of 0-9 minutes. In some alternative embodiments, the additional ten minutes may be distributed among the various computing devices that are lower than the overloaded computing device.

In step 415, having completed the processing of overloaded computing devices, the load management computing device may determine whether any of the computing devices are underloaded. Like the overload determination, this may be done by comparing the current load levels of the computing devices with their respective underload levels set in step 403.

If there is an underloaded computing device, then in step 416, the load management computing device may determine whether the underloaded computing device is the lowest in the hierarchy (e.g., one whose range begins with zero). If the lowest one is underloaded, then in step 417, the load management computing device may determine whether the second-lowest computing device in the hierarchy (e.g., the lowest one's neighbor) has capacity to assume the time range of the lowest computing device. This may be done by comparing the second computing device's current load against an absorption level, which may be the same level discussed above in step 412. If the second computing device's current load is below the absorption level, then in step 418, the lowest computing device's time range may be added to the range of the second-lowest computing device.

In step 419, the lowest computing device's time range may be reduced to zero (e.g., set to not accept further requests for streaming content), and may be scheduled for shutdown when it is completed servicing the requests that it is currently servicing. This may be done, for example, by setting the lowest computing device's upper and lower boundaries to both be zero.

In step 417, if the second computing device did not have capacity to assume the time range of the underloaded lowest computing device, then the load management computing device may simply leave things the way they are, moving on to step 422.

In step 416, if the underloaded computing device was not the lowest in the hierarchy, then the load management computing device may increase the underloaded computing device's range in step 420. This may be done, for example, by lowering the computing device's range's lower boundary. For example, if computing device 304 was determined to be underloaded in FIG. 3a, then its range may be adjusted and expanded from 46-60 min. to be from 36-60 minutes, or a lowering of the lower bound (46) by the underload adjustment interval (e.g., 10 minutes). If a computing device's adjustment would result in a negative value, then that computing device's lower bound is simply reduced to zero.

In step 421, the other computing devices that are lower than the underloaded computing device may have their respective ranges shifted by the adjustment interval. As with the overloaded situation, the shifting and adjustment in response to the underload situation may be done in a variety of ways, such as a flat time (e.g., 10 minutes) or a percentage (e.g., 20% of each computing device's own range), or by distributing the shifting among the various computing devices. If a shift would result in a computing device's upper or lower boundary going below zero, then that computing device's upper or lower boundary is set to zero. Any computing device whose upper and lower boundaries are set to zero becomes scheduled for shutdown, as with step 419 above.

In step 422, the load management computing device may determine whether any computing devices who are scheduled for shutdown (e.g., from step 419, or ones whose upper and lower bounds are set to zero in step 421) have finished transmitting, e.g., streaming, their assigned content, and are therefore idle with respect to the content streaming service. If any such computing devices are idle, then in step 423, the load management computing device may instruct those computing devices to shut down. A computing device that is shut down may enter a low power state, and may remain available for activation if needed in the future (e.g., from step 414). Shutting down the lowest-level computing devices in the hierarchy may be one efficient way of conserving power, since the lowest-level computing devices are the ones who are servicing the shortest content, and will be completed sooner.

After sending the shutdown instruction, or if none was needed from step 422, the load management computing device may return to step 405, and continue monitoring the computing devices for overload and underload levels.

Figure 4A:
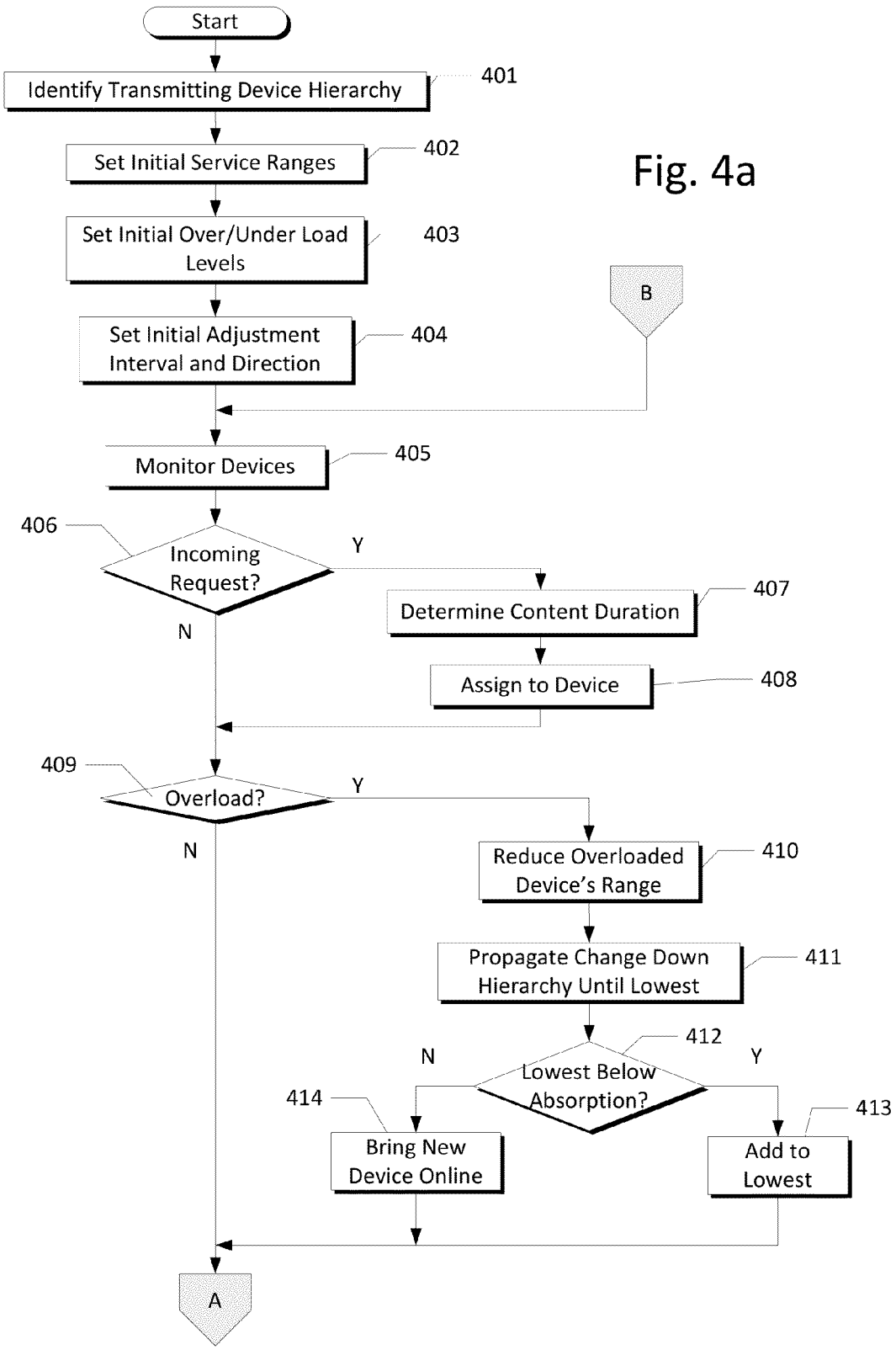
FIGS. 4a-b illustrate an example process flow for redistribution of processing load.
Figure 4B:
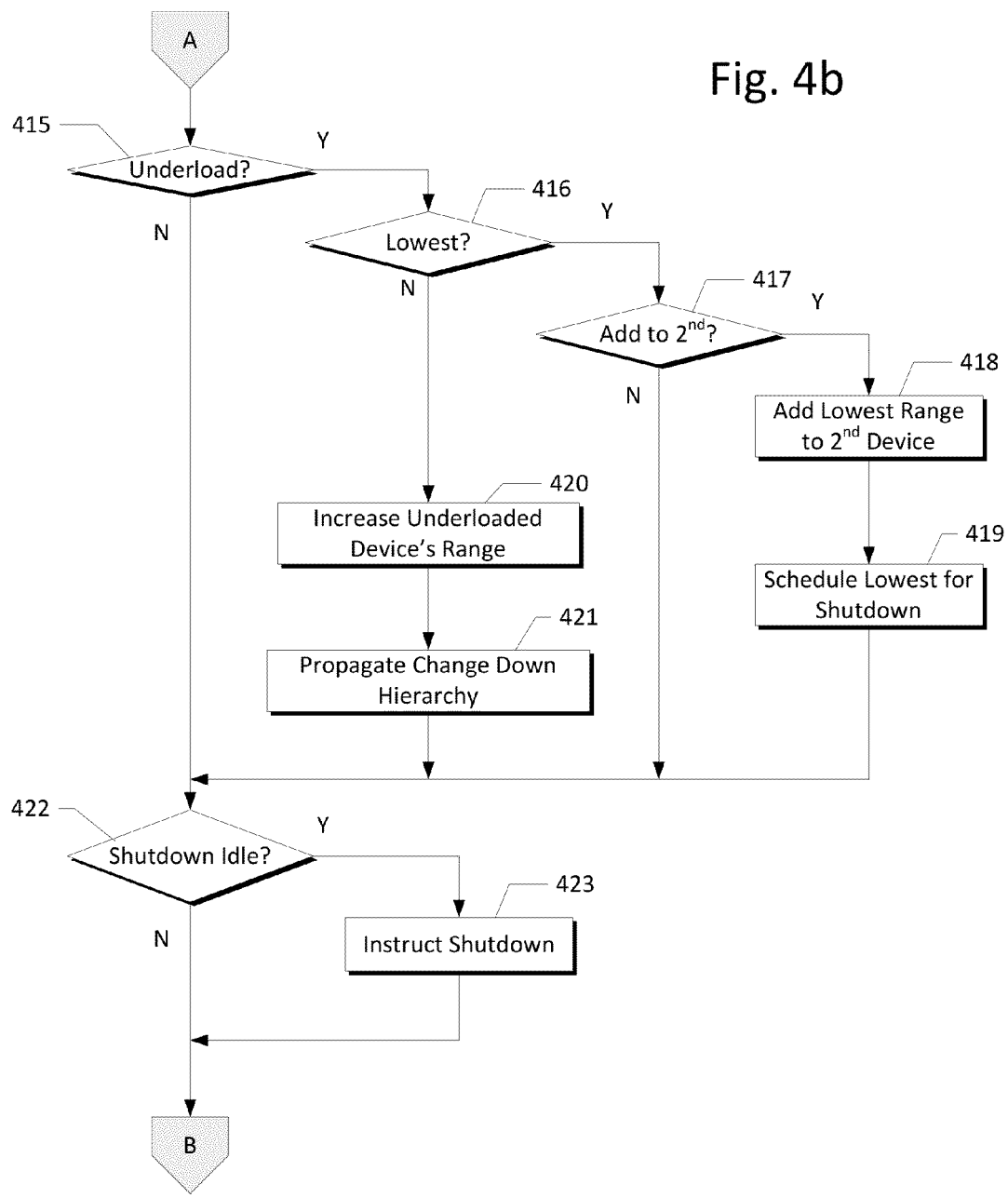

The FIG. 4a-b example process is just an example, and additional modifications and variations may be made. The various steps may be rearranged, combined, subdivided and/or omitted. One variation may be the direction of adjustment. The examples above adjusted the ranges to the lower levels in the hierarchy. In alternative embodiments, adjustments may be pushed in the other direction, upwards in the hierarchy. In some embodiments, the direction of adjustment may depend on the type of load that is causing an overload in step 409. To illustrate, the processing of a computing device may entail overhead processing, such as initially handling a request, setting up a streaming session and tearing the streaming session down, and substantive processing, such as the actual act of streaming the requested content. The load management computing device may monitor both types of loads at a computing device, overhead and substantive, and may store additional directional information for propagating a change depending on the type of load. The load management computing device may store information indicating that propagation should go upwards in the hierarchy if the overloaded computing device's processing is mostly (e.g., over 50%) due to overhead processing. In the situation of overload due to overhead, the overloaded computing device's range may still be reduced, but instead of raising the lower bound of its time range, the upper bound of its time range may be lowered (e.g., computing device 303 in FIG. 3a would have its ranged changed from 31-45 minutes to 31-35 minutes). The reduction may be propagated upwards in the hierarchy (e.g., computing devices 304 and 305 may have their time ranges shifted to compensate). This may have the result of shifting more burden to the computing devices who may be in a better position to absorb more overhead-laden requests, since they normally handle longer duration content that, by virtue of being longer in duration, have a smaller percentage of time devoted to overhead matters.

As another modification, the shifting of neighboring computing devices' time ranges may take into account the load levels of those neighboring computing devices. A neighboring computing device whose load is low (e.g., below a 25% threshold), may have its time range expanded as well as shifted (e.g., computing device 302 might be shifted five minutes to 21-35, and then have its upper bound expanded to 40, so that it covers the range 21-40 minutes instead of the 26-40 minute range discussed above. Computing devices that are being shifted may expand their ranges if their own loads are lower than the loads that are further below them in the hierarchy.

As another modification, the shifting of time ranges may be modified to avoid rapid back-and-forth changes and to control hysteresis. For example, determinations to shift a computing device's range may be delayed for an amount of time, such as a minute, to see if the over- or underloaded computing device's situation is momentary enough to ignore.

The discussion above already notes that the computing devices 301-305 and discussed in the FIGS. 4a-b process may each, in turn, be implemented using a plurality of computing computing device devices. For example, a group of ten (10) computing devices may pool together to handle one time range allocation in the hierarchy. In some embodiments, individual computing devices may be dedicated to handling certain predetermined selections of content. For example, one computing device may be dedicated to handling the content that is expected to be more popular (e.g., new release movies, top 40 songs, highly-ranked or demanded content, etc.), and that computing device (or computing devices) may simply be assumed to be always in demand, and it can always be kept on. Omitting it from the FIG. 4a-b process may help streamline the process of reallocating the time ranges.

Similarly, a computing device (or server) may be assigned to handle certain content that is expected to be unpopular (e.g., movies over five years old, television programs that are no longer airing, etc.), and those computing devices may be kept in a shutdown or standby state until their content is actually requested by a user. Keeping such a computing device out of the FIG. 4a-b process can also help streamline the process.

The example above assigns time ranges to computing devices. In some embodiments, computing devices may also be assigned to geographic regions, such as those homes served by a given local office 103. The expanding and contraction of a computing device's time range may also include the expansion or reduction in the computing device's geographic scope of responsibility. So an overloaded computing device that normally handle 2000 homes might be geographically reduced to handling only requests from half of those homes. A new computing device may be started up to handle the other half, or the time range for the other half can be handled by a different computing device in the hierarchy (e.g., computing device 302 may be responsible for requests for content that is 16-30 minutes long, and coming from homes in the first 1000 homes, and computing device 302a may be responsible for requests for content that is 16-45 minutes long, originating from the other 1000 homes for 16-30 minutes, and from any of the 2000 homes for 31-45 minutes). In this manner, responsibility between computing devices can be defined by both geographic area and time duration.

As an alternative to assigning time ranges based on duration of the content, some embodiments may assign time ranges corresponding to recency of access of the content. For example, one computing device may be assigned content that has been requested in the last five minutes. A second computing device may be assigned content that was requested between five and fifteen minutes ago. A third computing device may be assigned content that was requested between fifteen and thirty minutes ago, and so on and so forth. This assignment may be periodically performed, such that eventually, some computing devices may be assigned content that is rarely requested, and those computing devices may enter an inactive state.

As another example embodiment, the various computing devices may simply be assigned a constant, and common, processing load. For example, all computing devices may be targeted to operate at 75% of capacity. New incoming requests may be assigned to computing devices that are closest to 75%. In such an arrangement, if demand is low, then it can be expected that some computing devices will eventually finish out their requests, and at that point they can be instructed to enter an idle state. Alternatively, computing devices who are handling streams for received requests may be instructed to transfer responsibility for those streams to another computing device, to keep the other computing devices at the 75% level. The transfer of the streams may be coordinate between the computing devices to help ensure a seamless transition from the user perspective.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   associating content duration time ranges with each of a plurality of content transmitting computing devices;
   receiving a request for content;
   determining a duration of the content;
   identifying which of the content duration time ranges corresponds to the determined duration; and
   assigning the received request to a content transmitting computing device whose content duration time range corresponds to the determined duration.

2. The method of claim 1, wherein the method further comprises:
   in response to determining that one of the plurality of content transmitting computing devices has become overloaded, reducing the content duration time range of the one of the plurality of content transmitting computing devices for future content requests.

3. The method of claim 2, wherein the reducing the content duration time range of the one of the plurality of content transmitting computing devices comprises raising a lower time bound of the content duration time range for future content requests.

4. The method of claim 2, further comprising determining an amount of time range reduction based on a capacity of another one of the plurality of content transmitting computing devices.

5. The method of claim 2, wherein the plurality of content transmitting computing devices are assigned successive time ranges in a hierarchy, the method further comprising:
   determining an amount of a load of the one of the plurality of content transmitting computer devices that has become overloaded that is due to overhead processing, and using the determined amount to determine a direction of propagating time range changes in the hierarchy.

6. The method of claim 2, wherein the plurality of content transmitting computing devices are assigned successive time ranges in a hierarchy, the method further comprising:
   shifting content duration time ranges of content transmitting computing devices that are lower in the hierarchy than the one of the plurality of content transmitting computing devices that has become overloaded in response to the reducing;
   determining whether a lowest content transmitting computing device in the hierarchy has capacity to absorb a time range gap caused by the shifting; and
   either bringing a new content transmitting computing device online or expanding a time range of the lowest content transmitting computing device based on the determination of whether the lowest content transmitting computing device has capacity to absorb the time range gap.

7. The method of claim 1, wherein the method further comprises:
   in response to determining that one of the plurality of content transmitting computing devices has become underloaded, increasing the content duration time range associated with the one of the plurality of content transmitting computing devices.

8. The method of claim 7, wherein the plurality of content transmitting computing devices are assigned successive time ranges in a hierarchy, the method further comprising:
   shifting the content duration time ranges of other ones of the plurality of content transmitting computing devices in response to the increasing; and
   determining that a shift of a lowest one of the plurality of content transmitting computing devices in the hierarchy will result in a zero time range, and in response thereto, scheduling the lowest content transmitting computing device for shutdown upon completion of its currently active streaming sessions.

9. The method of claim 1, further comprising assigning a first content transmitting computing device to handle a predetermined selection of content based on anticipated popularity, and wherein the first content transmitting computing device is not assigned a content duration time range.

10. The method of claim 1, further comprising assigning a content transmitting computing device a geographic range in addition to a content duration time range.

11. A method comprising:
associating different corresponding content duration time ranges with different ones of a plurality of content transmitting computing devices; and
distributing content requests to the plurality of content transmitting computing devices based on their corresponding content duration time ranges and respective durations of content requested by the content requests.

12. The method of claim 11, wherein the plurality of content transmitting computing devices are assigned successive time ranges in a hierarchy, and wherein the method further comprises:
in response to determining that one of the plurality of content transmitting computing devices has become overloaded or underloaded, adjusting the content duration time range of the one of the plurality of content transmitting computing devices, and propagating a corresponding content duration time range change to other ones of the plurality of content transmitting computing devices, based on the hierarchy.

13. The method of claim 12, further comprising:
determining a direction of the propagation based on a determination of an amount of load in an overloaded content transmitting computing device that is due to overhead processing;
propagating content duration time range changes upwards in the hierarchy if a primary cause of overloading the overloaded content transmitting computing devices is content request overhead processing; and
propagating content duration time range changes downwards in the hierarchy if the primary cause of overloading the overloaded content transmitting computing devices is content request substantive processing.

14. The method of claim 11, wherein the plurality of content transmitting computing devices are assigned successive time ranges in a hierarchy, and wherein the method further comprises:
shifting content duration time ranges of one or more content transmitting computing devices that are lower in the hierarchy than a content transmitting computing device that has become overloaded or underloaded by an adjustment interval.

15. The method of claim 14, further comprising shifting content duration time ranges of one or more content transmitting computing devices that are lower in the hierarchy than the content transmitting computing device that has become overloaded or underloaded, and using a different adjustment for each one of the one or more content transmitting computing devices whose content duration time ranges are shifted.

16. A method, comprising:
defining a plurality of sequential content duration time ranges;
assigning each content duration time range to a different content transmitting computing device;
using the assigned content duration time ranges to determine which content transmitting computing device should handle an incoming request for content;
measuring a load level of a first content transmitting computing device; and
changing a content duration time range assigned to the first content transmitting computing device in response to determining that the first content transmitting computing device has become overloaded or underloaded.

17. The method of claim 16, further comprising:
determining that the first content transmitting computing device is underloaded, and in response, changing the content duration time range assigned to the first content transmitting computing device by reducing a lower time boundary of the content duration time range assigned to the first content transmitting computing device; and
shifting content duration time ranges of one or more additional content transmitting computing devices in response to the shifting of the content duration time range assigned to the first content transmitting computing device, wherein the shifting shifts the content duration time ranges by an adjustment interval that equals an amount by which the content duration time range assigned to the first content transmitting computing device was reduced.

18. The method of claim 1, wherein the content comprises streaming content and wherein the determined duration comprises one of a duration of consumption of the content or a duration of transmission of the content.

19. The method of claim 11, wherein the content comprises streaming video content and wherein the durations of content comprise durations of consumption of content stored on the plurality of content transmitting computing devices.

20. The method of claim 16, wherein each of the plurality of sequential content duration time ranges comprises a plurality of content consumption time ranges.

* * * * *